United States Patent [19]
Ji

[11] Patent Number: 5,467,333
[45] Date of Patent: Nov. 14, 1995

[54] TRAY AND DISC DRIVING MECHANISM FOR LASER DISC PLAYER

[75] Inventor: Jae H. Ji, Inchon, Rep. of Korea

[73] Assignee: Samsung Electronics Co., Ltd., Kyungki, Rep. of Korea

[21] Appl. No.: 282,782

[22] Filed: Jul. 25, 1994

Related U.S. Application Data

[63] Continuation of Ser. No. 987,800, Dec. 9, 1992, abandoned.

[30] Foreign Application Priority Data

Feb. 27, 1992 [KR] Rep. of Korea ............... 92-3045

[51] Int. Cl.[6] ........................................... G11B 33/02
[52] U.S. Cl. ............................................... 369/75.2
[58] Field of Search .................... 369/36, 75.1, 75.2, 369/77.1, 266, 196; 360/99.02, 99.03, 99.06, 99.07

[56] References Cited

U.S. PATENT DOCUMENTS

| | | | |
|---|---|---|---|
| 4,665,453 | 5/1987 | Mikamoto et al. | 360/99.04 |
| 4,755,978 | 7/1988 | Takizawa et al. | 369/37 |
| 4,829,393 | 5/1989 | Shimizu et al. | 360/99.07 |
| 4,845,700 | 7/1989 | Koizumi et al. | 369/75.2 |
| 4,979,160 | 12/1990 | Araki | 369/75.2 |
| 5,119,357 | 6/1992 | Tsuruta et al. | 360/99.03 |
| 5,218,593 | 6/1993 | Kaneo et al. | 369/75.2 |
| 5,267,105 | 11/1993 | Morikawa et al. | 369/75.2 |

*Primary Examiner*—Stuart S. Levy
*Assistant Examiner*—George J. Letscher
*Attorney, Agent, or Firm*—Sughrue, Mion, Zinn, Macpeak & Seas

[57] ABSTRACT

A tray and disc driving mechanism for a laser disc player. A single driving motor is used both for playing a disc and for conveying a tray in order to load or unload the disc. A driving portion transmits power to a turntable and a tray. Thus, a disc can be played and ejected with a single motor, and therefore, the operation of the device is accurate, the number of required components is decreased and manufacturing costs are lowered.

2 Claims, 8 Drawing Sheets

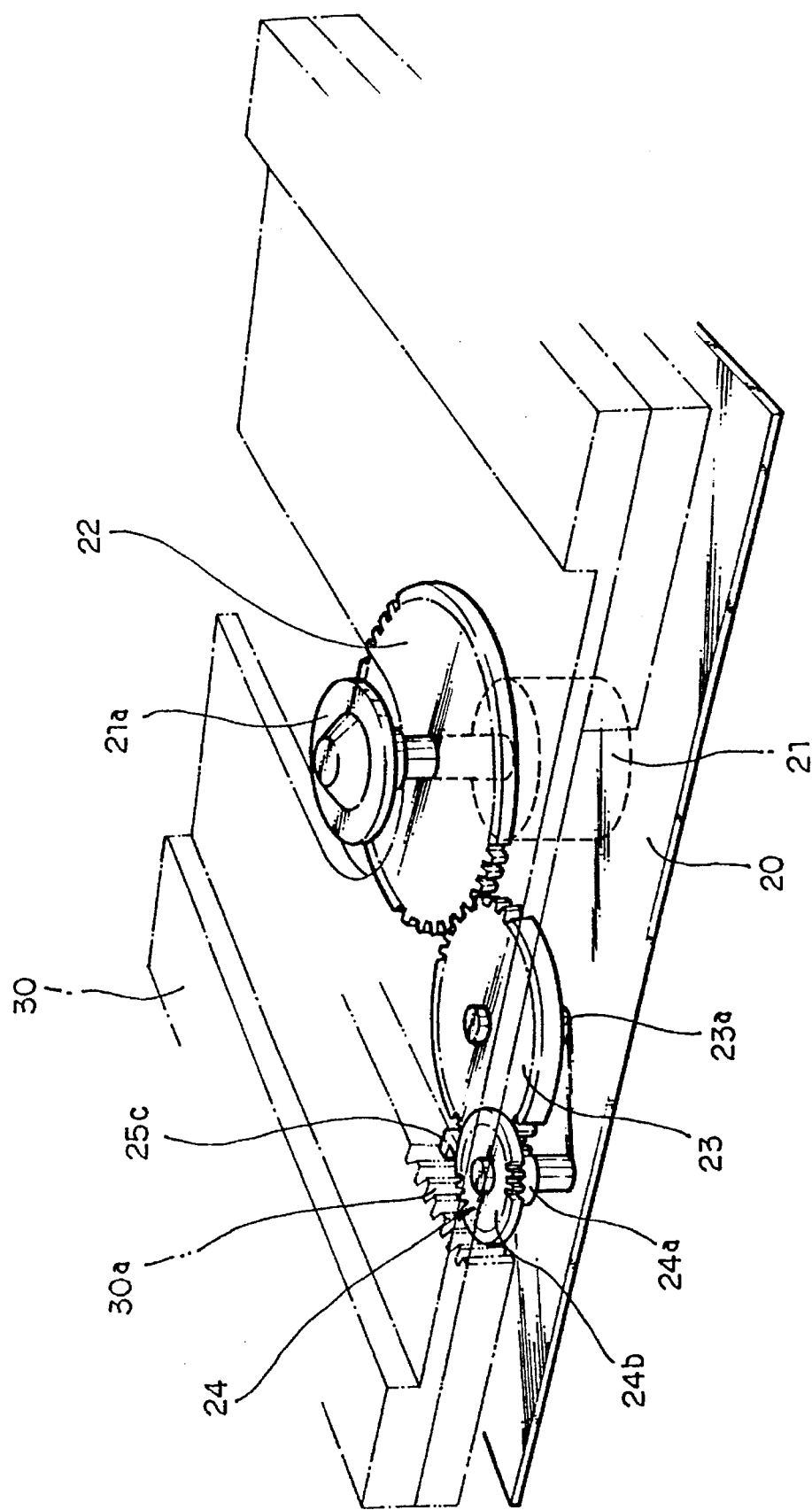

TRAY AND DISC DRIVING MECHANISM FOR LASER DISC PLAYER

This is a Continuation of application Ser. No. 07/987,800 filed Dec. 9, 1992 now abandoned.

BACKGROUND OF THE INVENTION

1. Field of the Invention

The present invention relates to a laser disc player, and particularly to a tray and disc driving mechanism for a laser disc player in which a tray and a turntable can be driven by a single motor.

2. Description of the Related Art

Generally, as shown in FIG. 1, a conventional laser disc player includes a spindle motor 10 for spinning a disc in a single forward direction past a reading device, so as to reproduce data recorded on the disc, and a driving motor 12 for loading and unloading a tray 11 carrying the disc. A turntable 10a is installed on the tip of the shaft of the spindle motor 10 so that a disc (not shown) can be supported on the turntable. Further, a first gear 14 which receives driving power from a belt 13 is installed proximate the driving motor 12. A second gear 15 is engaged with the first gear 14. The second gear 15 is also engaged with a rack 11a formed on the tray 11.

In such a conventional laser disc player, power is transmitted from the driving motor 12 through the belt 13 to the first gear 14, and then, to the second gear 15, so that the tray 11 can be loaded or unloaded depending upon the direction of rotation of the motor. Further, if the spindle motor 10 is activated, the turntable 10a, which is installed on the shaft of the spindle motor 10, is also rotated so that a disc mounted on the turntable 10a can be played.

However, in the conventional laser disc player described above, separate motors for driving the tray and for driving the turntable are separately installed and driven. Accordingly, the manufacturing cost and power consumption of such a device is high, thereby making the disc player uneconomical. Further, because two separate motors are used, the number of peripheral drive components required is also increased. Therefore, the operation of such a device may be inaccurate and unreliable due to deviations in the dimensions of the peripheral components.

SUMMARY OF THE INVENTION

The present invention is intended to overcome the above described disadvantages of the conventional devices.

Therefore, it is an object of the present invention to provide a tray and disc driving mechanism for a laser disc player in which a disc is driven by means of a single motor, and thus the operation of the disc player is accurate and reliable. Also, the manufacturing costs of such a device are lowered.

According to the present invention, there is provided a tray and disc driving mechanism for a laser disc player, wherein the disc is played by mounting the disc on a turntable after a tray carrying the disc is conveyed to an inside of the mechanism. The invention has a single driving portion, a portion for performing playback of the disc by rotating and driving the disc mounted on the turntable and a portion for moving the tray. The portion for moving the tray has an idle revolution device for preventing driving power of the driving portion from being transmitted to the tray during playback.

BRIEF DESCRIPTION OF THE DRAWINGS

The above object and other advantages of the present invention will become more apparent by the following detailed description of the preferred embodiment of the present invention with reference to the attached drawings in which:

FIG. 2 is a perspective view of portions of the tray carrying mechanism of a laser disc player according to the preferred embodiment of the present invention;

DETAILED DESCRIPTION OF THE PREFERRED EMBODIMENT

Figure 1:
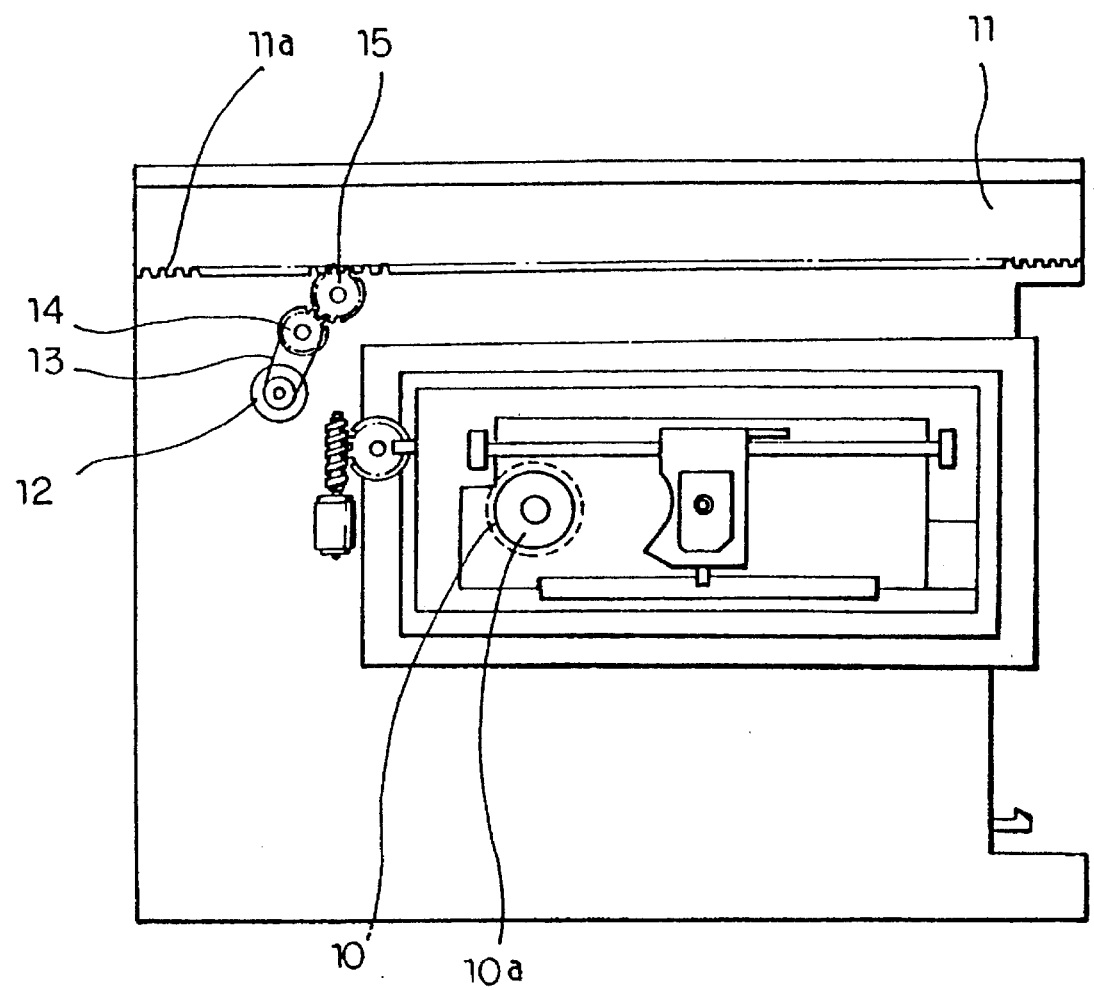
FIG. 1 is a plan view showing a tray and disc driving mechanism of a conventional laser disc player.

FIGS. 2 to 7C illustrate a tray and disc driving mechanism for a laser disc player according to the preferred embodiment of the present invention. A driving motor 21, which can be selectively driven in forward and reverse directions, is installed at a predetermined position on a deck 20 of the laser disc player. A turntable 21a is installed on a distal portion of the shaft of the driving motor 21. Further, a spindle gear 22 is coaxially installed on the shaft between the driving motor 21 and the turntable 21a, so that the gear 22 rotates together with the turntable 21a.

A power transmitting portion is installed at one side of the spindle gear 22 in order to transmit the rotation of the driving motor 21 to tray 30. The power transmitting portion includes a cam gear 23 engaged with the spindle gear 22 and rotatably supported by a shaft 23a installed on the deck 20, a two-step gear 24 consisting of a pinion 24b and a rotating gear 24a which is engaged with the cam gear 23.

The cam gear 23 has cam slots formed on the bottom thereof. The cam slots consist of, an inner cam slot 23b formed on the inner portion of the face of the cam gear 23, an outer cam slot 23c formed on the outer portion of the face of the cam gear 23, and a spiral cam slot 23d connecting the inner and outer cam slots 23b and 23c (see FIG. 3A).

A cam pin 25a is formed on one end of an actuation lever 25 which is pivotally supported on the deck 20 by means of a shaft 25b. The cam pin 25a is inserted into one of the cam slots 23b, 23c and 23d. The other end of the actuation lever 25 is provided with an engaging step 25c. Further, a spring 26 is installed between the cam pin 25a and the shaft 23a of the cam gear 23, thereby biasing the cam pin 25a through compression or tension of the spring 26.

A rack 30a is formed on a bottom surface of the tray 30 and a projection 30b is formed on one side of the rack 30a so as to be in contact with the engaging step 25c of the actuation lever 25 when actuation lever 25 is at a predetermined position. Further, sensor switch 27 is installed at a predetermined position upon the deck for limiting travel of the tray 30.

Figure 3A:
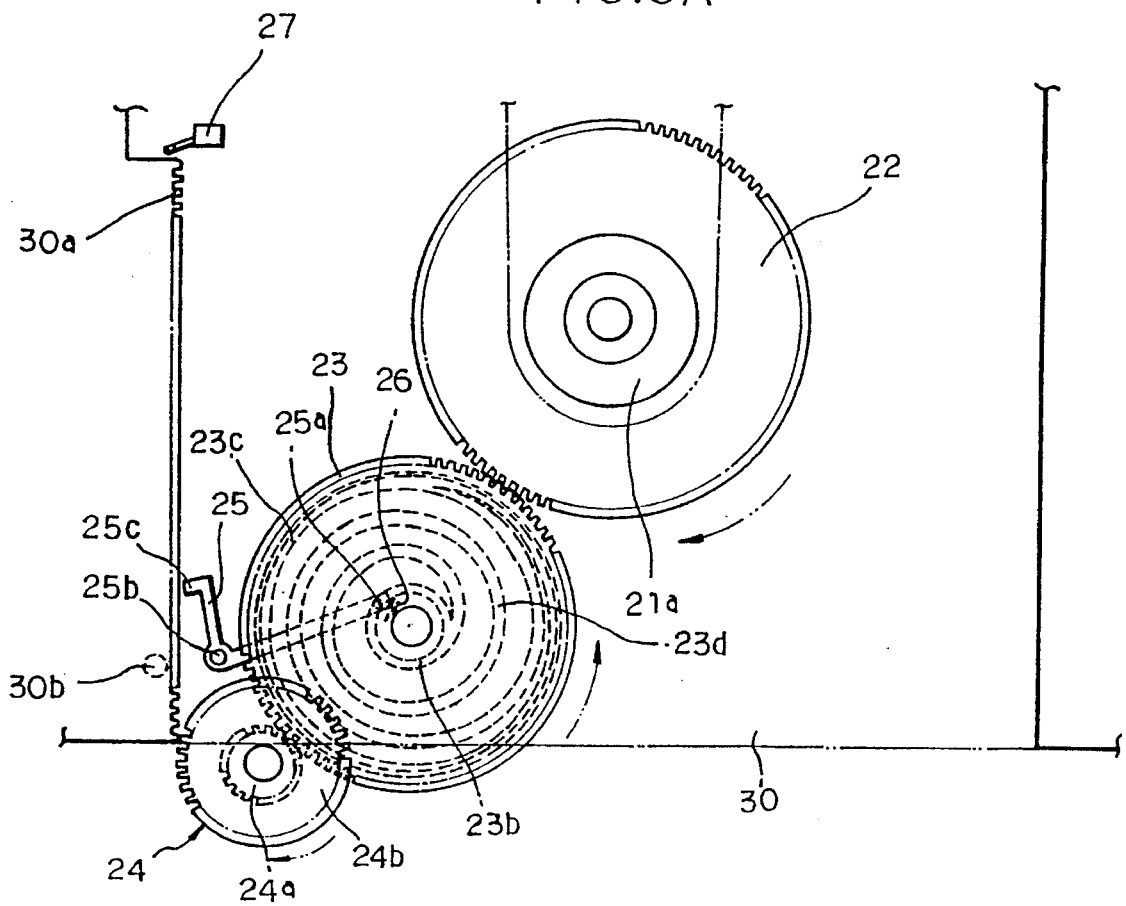
FIGS. 3A and 3B illustrate the preferred embodiment while reproducing data recorded on a disc.
Figure 3B:
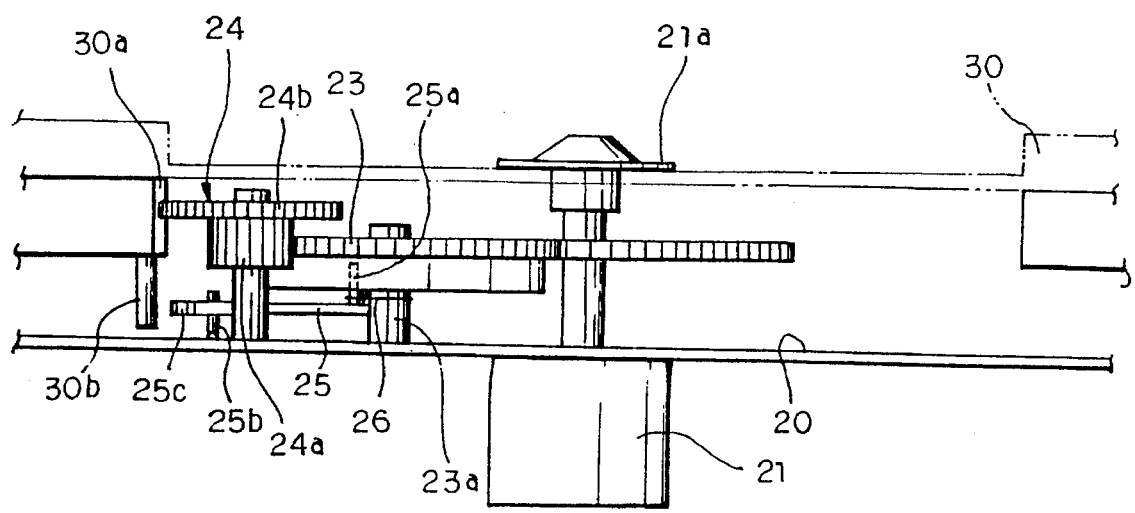

The operation of tray carrying mechanism for a laser disc player constituted as above will now be described. FIGS. 3A and 3B illustrate a state in which a disc (not shown) is mounted on the turntable 21a so as to be subjected to a normal play mode. Of course, if the spindle motor 21 rotates clockwise (forward direction) then the spindle gear 22 and the turntable 21a also rotate clockwise. Thus, if the spindle gear 22 rotates in the forward direction, the cam gear 23 rotates counterclockwise, while the two-step gear 24, which is engaged with the cam gear 23 through the rotating gear 24a, rotates in the forward direction along with the spindle gear 22.

Under this condition, the pinion 24b, of the two-step gear 24, which is rotating in the forward direction, is not engaged with the rack 30a of the tray 30, and therefore, the cam gear 23 and the two-step gear 24 perform idle revolutions. Also, the cam pin 25a of the actuation lever 25 is guided within the circular inner cam slot 23b in order to perform idle revolutions. As shown in FIGS. 3A and 3B, when the cam pin 25a of the actuation lever 25 stays within the inner cam slot 23b, the spring 26 which is installed between the shaft 23a and the cam pin 25a is compressed, and therefore, the cam pin 25a is biased outward by the elastic forces of the spring 26.

The spiral cam slot 23d is formed at a sharp angle relative to the circular inner cam slot 23b so that the cam pin 25a is not guided into the spiral cam slot 23d while the cam gear 23 rotates in a counterclockwise direction. Accordingly, the cam pin 25a is guided only within the circular inner cam slot 23b during a play mode.

Figure 4A:
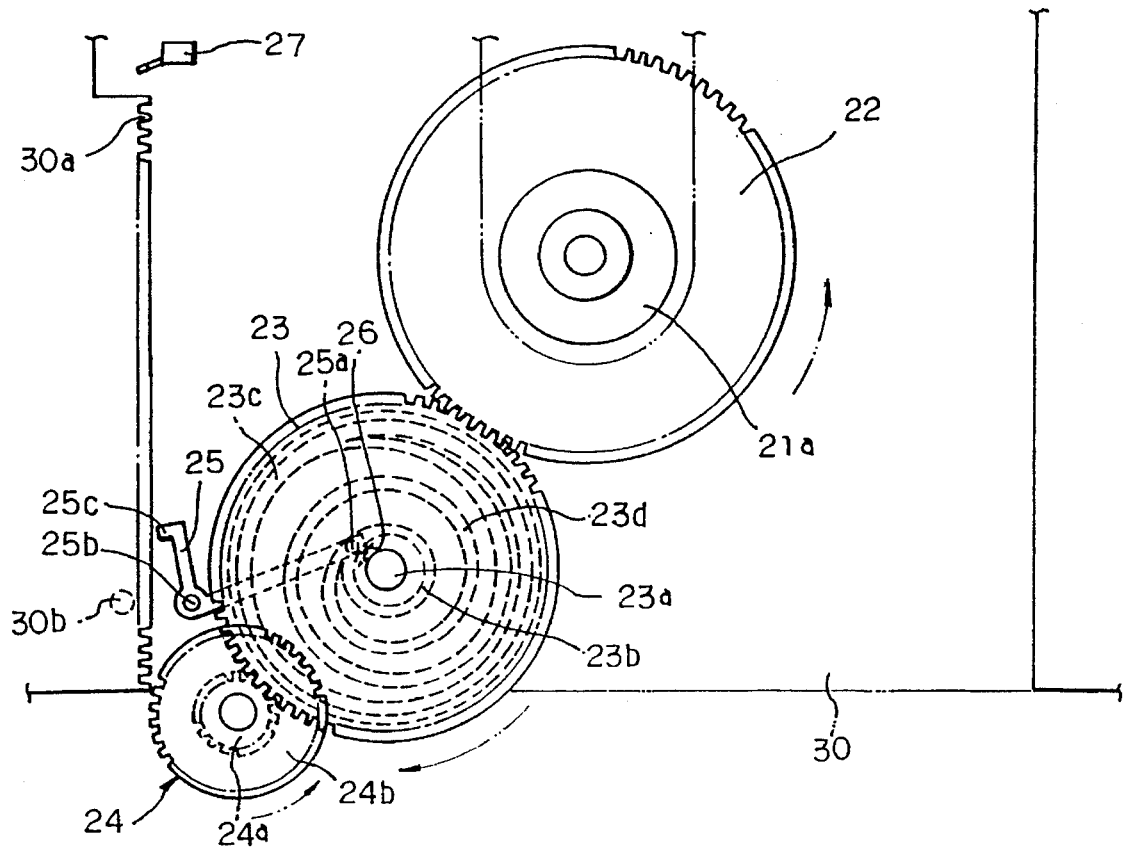
FIGS. 4A to 4C illustrate an initial step of driving the spindle motor in reverse in order to eject the tray in the preferred embodiment of the present invention.
Figure 4B:
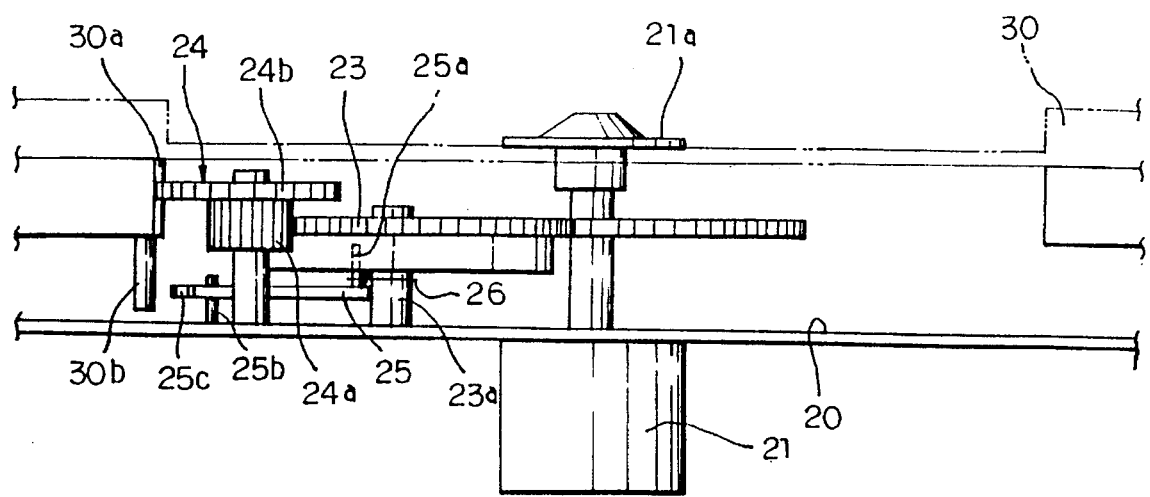

If the disc being played is to be replaced with another one, the tray is ejected in the following manner. As shown in FIGS. 4A and 4B, if the spindle motor 21 is driven in a counterclockwise (reverse) direction operation by operation of a switch (not shown), the turntable 21a and the spindle gear 22 also rotate in the reverse direction. In accordance with the reverse rotation of the spindle gear 22 as described above, the cam gear 23 rotates clockwise, while the two-step gear 24, which is engaged with the cam gear 23 through the rotating gear 24a, rotates counterclockwise.

Figure 4C:
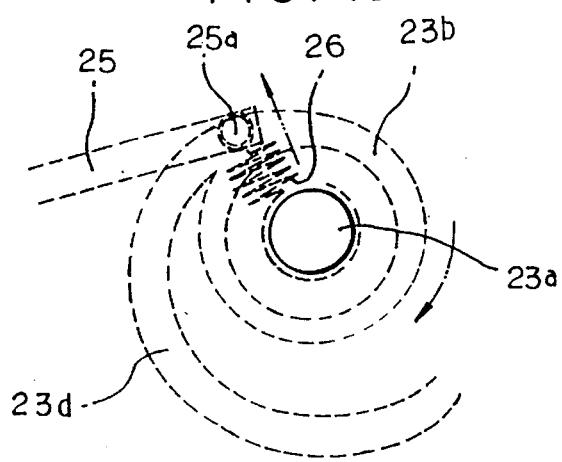

In accordance with the clockwise rotation of the cam gear 23, the cam pin 25a of the actuation lever 25, which has been performing idle revolutions, advances into the entrance of the spiral cam slot 23d because, as shown in FIG. 4C, the compressed spring 26 acts on the cam pin 25a to bias it outward as the cam gear 23 rotates clockwise. Therefore, when the cam pin 25a arrives at the entrance of the spiral cam slot 23d (which is formed counterclockwise), the cam pin 25a enters into the spiral cam slot 23d and is guided therethrough.

Figure 5A:
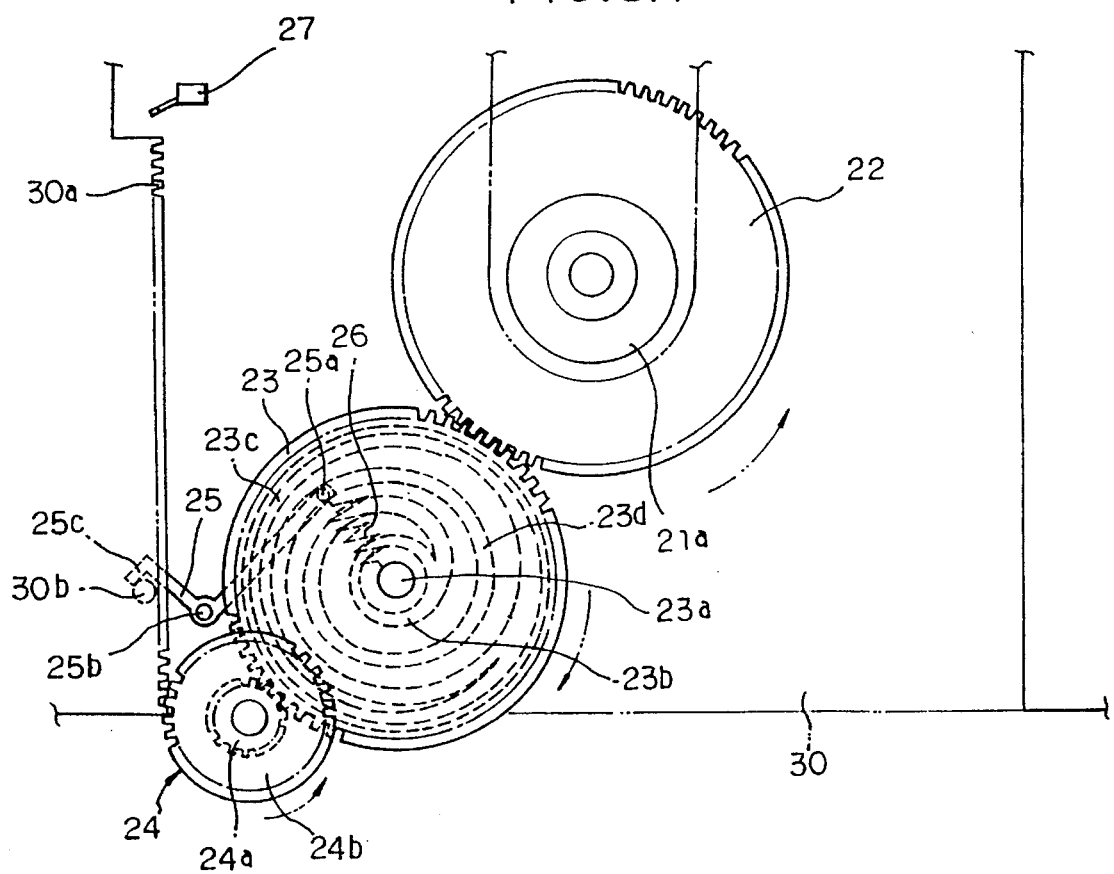
FIGS. 5A and 5B illustrate an initial step of ejecting the tray in the preferred embodiment of the present invention.
Figure 5B:
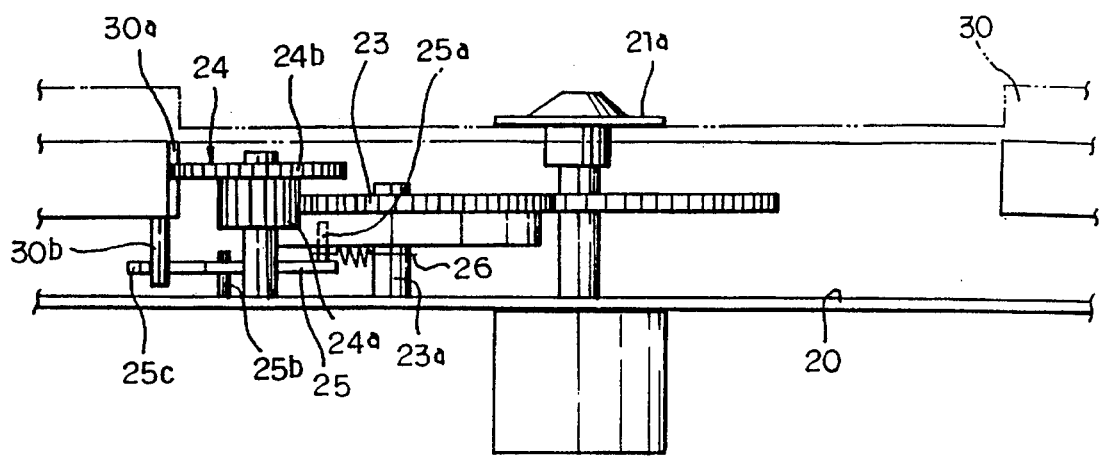
Figure 6A:
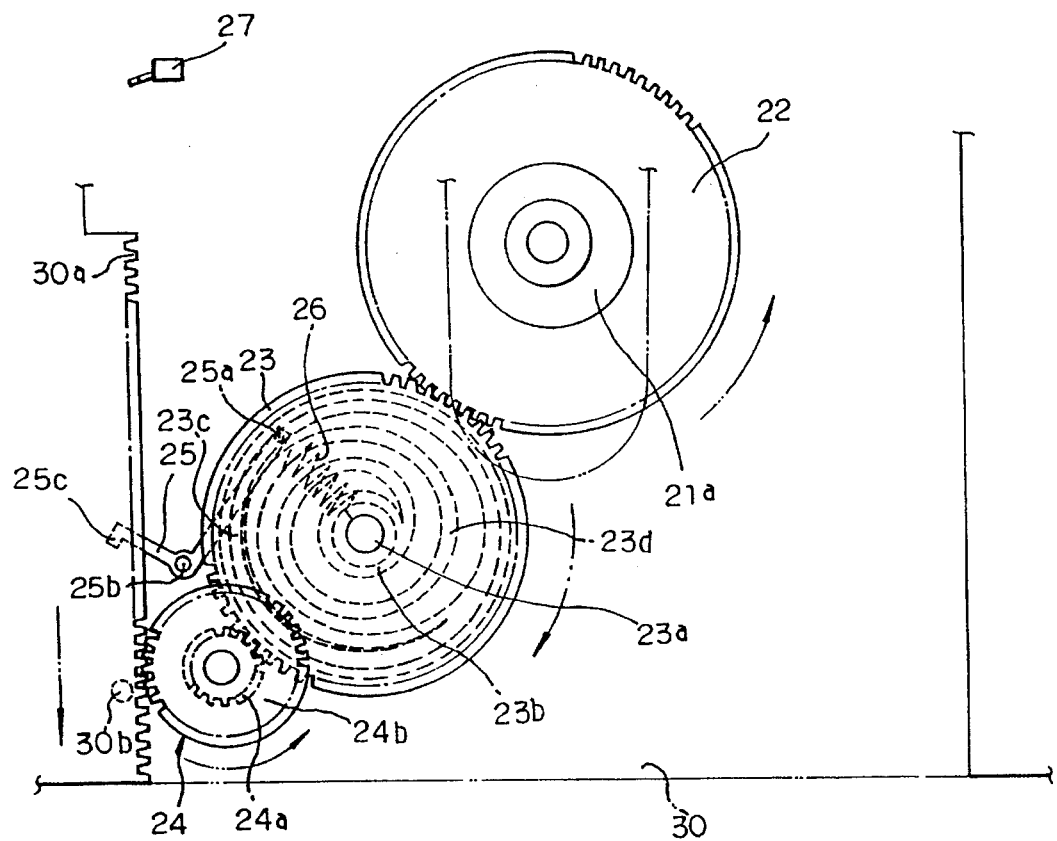
FIGS. 6A and 6B illustrate a state in which the tray has been ejected a certain distance.
Figure 6B:
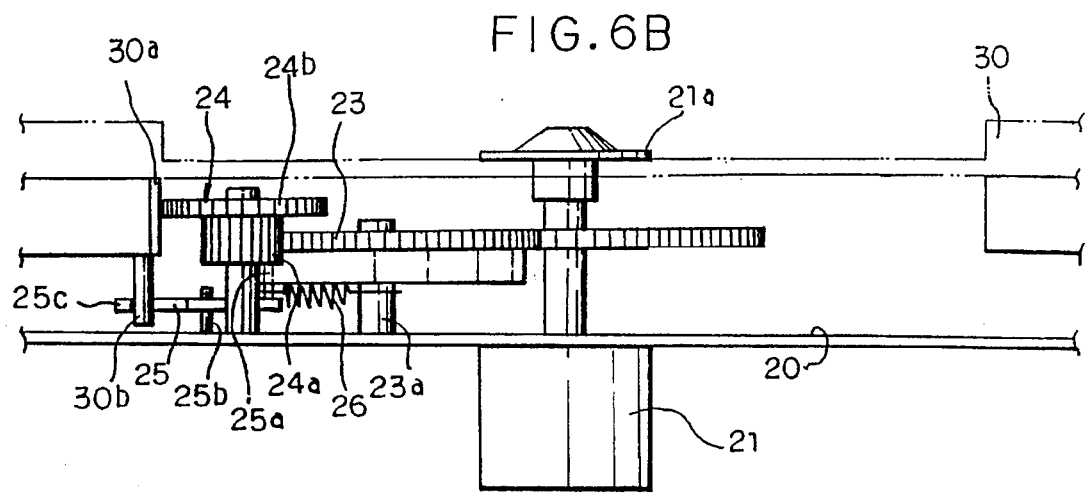

Thus, as the cam pin 25a moves outward while being guided along the spiral cam slot 23d, the actuation lever 25 pivots around the shaft 25b as shown in FIGS. 5A and 5B until the engaging step 25c of the actuation lever 25 pushes on projection 30b which is formed under the tray 30. When the engaging step 25c of the actuation lever 25 pushes the projection 30b, the tray 30 moves until the pinion 24b of the two-step gear 24 and the rack 30a of the tray 30 are engaged with each other (downward in FIG. 5A). Then, by virtue of engagement between the rack 30a and the pinion 24b, the tray 30 is conveyed to the front of the apparatus to be ejected as shown in FIGS. 6A and 6B. When tray 30 is completely ejected, the rotation of the spindle motor 21 is terminated in response to a signal from an appropriately positioned sensor (not shown).

Figure 7A:
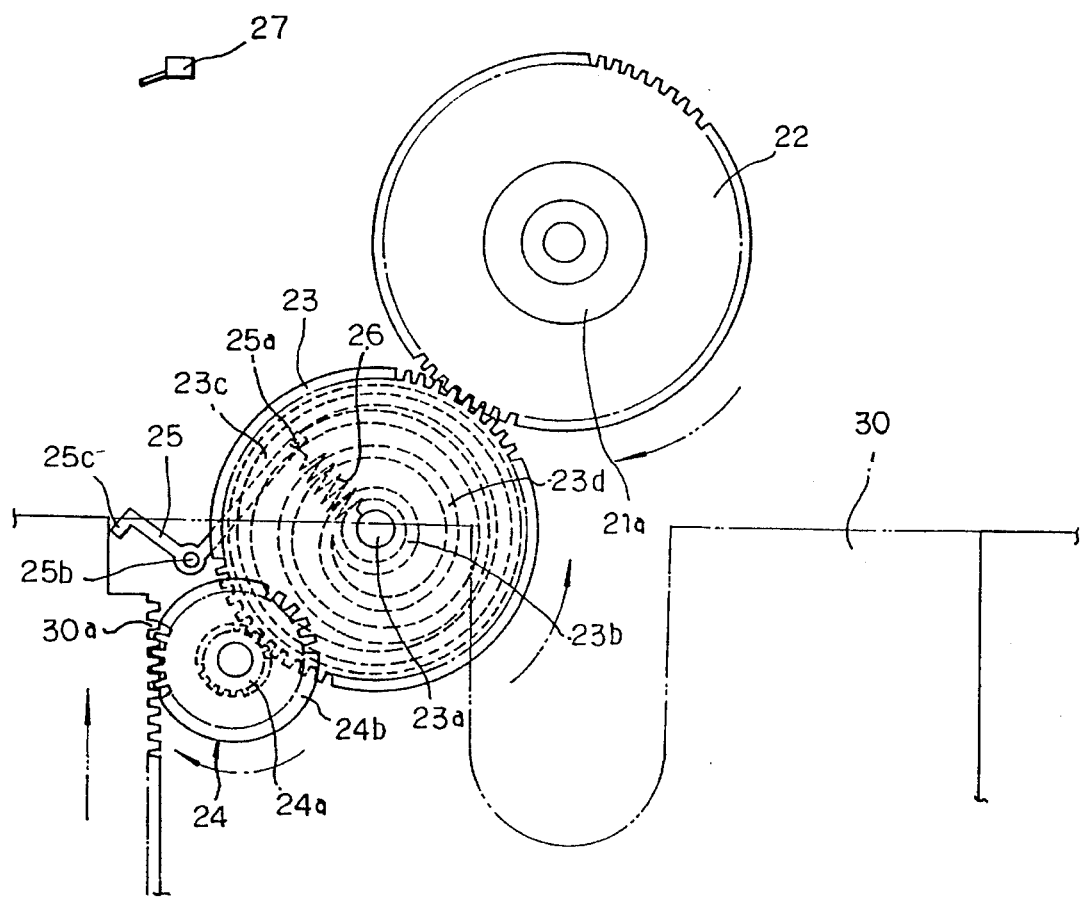
FIGS. 7A to 7C illustrate a completely ejected tray and initial step of inserting the tray into the player again.
Figure 7B:
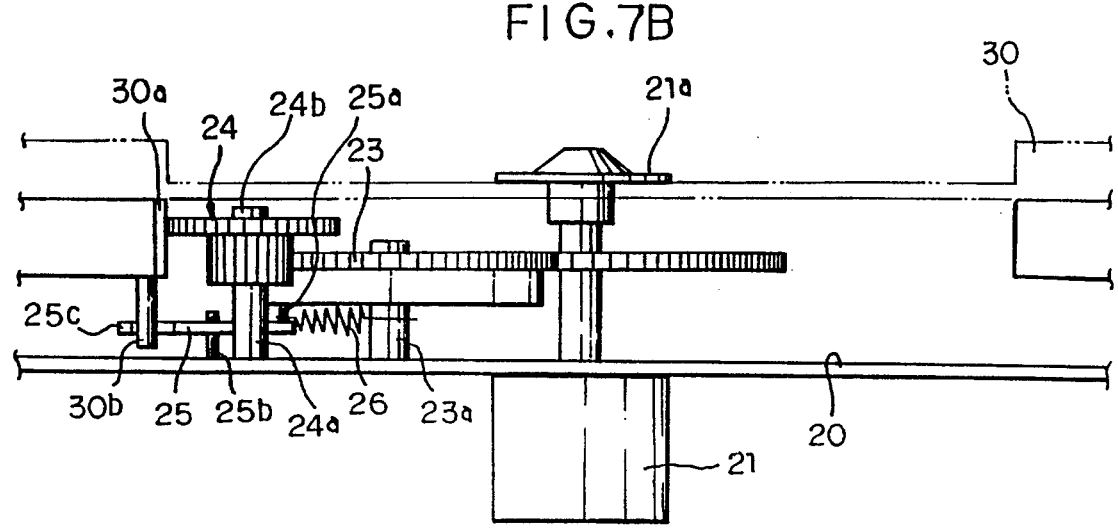

Thereafter, if the replaced disc is to be played, the spindle motor 21 is driven clockwise, so that the turntable 21a and the spindle gear 22 rotate in the same direction as shown by the arrow in FIGS. 7A and 7B. When the spindle gear 22 rotates the cam gear 23 rotates counterclockwise, while the two-step gear 24 rotates clockwise (forward), driven by the cam gear 23. Thus, when the two-step gear 24 rotates clockwise, the tray 30 is conveyed into the player again, (upward in FIG. 7A) and, at the same time, the cam pin 25a which has been disposed within the circular outer cam slot 23c enters back into the spiral cam slot 23d in the manner described below.

Figure 7C:
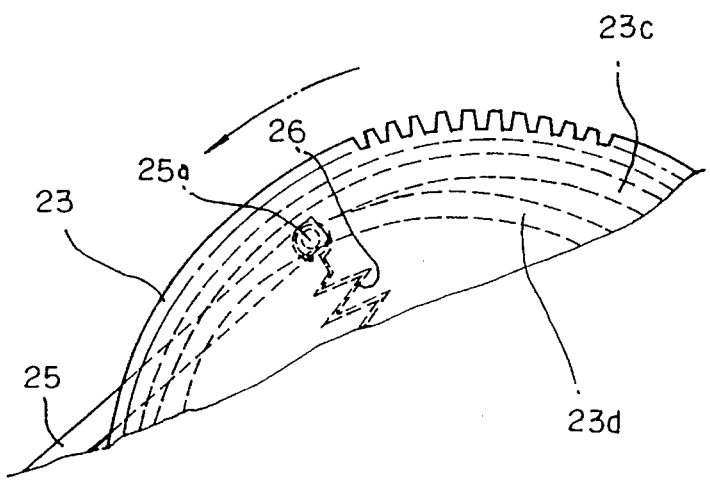

If the cam gear 23 revolves counterclockwise as shown in FIG. 7C, the cam pin 25a is guided within the circular outer cam slot 23c. However, when the cam pin 25a arrives at the entrance of the spiral cam slot 23d, the spring 26, which is now under tension, biases the cam pin 25a toward the center of the cam gear 23. Thus, with the cam pin 25a being pulled inward, the cam pin 25a advances into the spiral cam slot 23d, because the entrance which connects the outer cam slot 23c to the spiral cam slot 23d is formed in the clockwise direction, and because the cam gear 23 is now rotating counterclockwise.

When the cam pin 25a advances into the spiral cam slot 23d, the actuation lever 25 pivots in the reverse direction until it is in the position shown in FIG. 3A. The tray 30 is completely conveyed into the device and the rotation of the spindle motor 21 is terminated when tray 30 hits switch 27. Thus, the tray 30 is conveyed far enough into the device so that the rack 30a of the tray 30 is released from engagement with the pinion 24b. After that, the disc carried on the tray 30 is mounted on the turntable 21a through a known mechanism. The disc is then played by activating the spindle motor 21 in a clockwise direction, and at this time, the cam gear 23 and the two-step gear 24 idly rotate as described above.

It is to be noted that a pulley can be installed in place of the spindle gear, and another pulley can be installed on the top of the cam gear, and the two pulleys can be connected by a belt or the like.

According to the present invention, the tray and disc driving mechanism for a laser disc player includes only a single motor both for playing a disc and for conveying the tray. Accordingly, the power consumption is decreased, the manufacturing cost is lowered and the number of the peripheral components is reduced. Further, according to the present invention, the operations are rendered more accurate because of the simplification of the structure.

Although the present invention has been described above with respect to a preferred embodiment, various changes and modifications can be made without departing from the scope of the invention as defined by the appended claims.

What is claimed is:

1. A tray and disc driving mechanism for a laser disc player comprising:

a housing;

a tray slidably mounted in said housing so as to move between a first position, which corresponds to a playing position, and a second position, which corresponds to an ejected position;

a motor, having a shaft, mounted in said housing;

a turntable mounted on said shaft;

a first gear mounted on said shaft;

a second gear rotatably mounted in said housing so as to be engaged with said first gear, said second gear having a cam slot formed thereon, respective inner and outer portions of said cam slot being connected by a spiral portion thereof;

a pinion operatively engaged with said second gear;

a rack formed on said tray;

a lever, pivotally mounted in said housing, one end of said guide lever being engaged in said cam slot;

said rack being engaged with said pinion while said tray is between said first position and a critical position which is between said first and second position;

said one end of said lever moving from said inner portion to said outer portion, through said spiral portion, when said second gear is rotated in a predetermined direction which corresponds to a direction of said spiral portion, said lever pushing said tray from said first position to said critical position as said lever moves from said inner portion to said outer portion.

2. A tray and disc driving mechanism for a laser disc player comprising a housing, a motor having a shaft, a turntable mounted on said shaft, a tray formed of a rack and a guide projection and said disc, and means for moving said tray by virtue of said motor, wherein said moving means comprises:

a first gear mounted on said shaft;

a second gear rotatably mounted in said housing so as to be engaged with said first gear, said second gear having a cam slot formed thereon, and respective inner and outer portions of said cam slot being connected by a spiral portion thereof;

a two-step gear having a revolving gear which is engaged with said second gear, and a pinion which is engaged with said rack; and a lever pivotally mounted in said housing, said lever having a cam pin protruding from one end thereof, said cam pin being guided within said cam slot, and the other end of said lever being selectively engaged with said guide projection to push said rack into engagement with said pinion.

* * * * *